United States Patent [19]

Doak

[11] Patent Number: 5,205,172

[45] Date of Patent: Apr. 27, 1993

[54] ELECTRONIC GAUGE FOR INTERFACE MEASUREMENTS

[76] Inventor: Roni K. Doak, 2379 Briarwest Blvd. No. 29, Houston, Tex. 77077

[21] Appl. No.: 764,030

[22] Filed: Sep. 23, 1991

[51] Int. Cl.$^5$ .................. G01F 23/04; G01F 23/24
[52] U.S. Cl. .................................. 73/295; 33/731; 340/450.3; 340/622
[58] Field of Search ............. 33/722, 729, 731, 721; 73/295; 340/622, 450.3, 450.1

[56] References Cited

U.S. PATENT DOCUMENTS

| | | | |
|---|---|---|---|
| 2,988,718 | 6/1961 | Muehlner | 73/295 |
| 3,742,245 | 6/1973 | Hallen et al. | 73/295 |
| 4,476,714 | 10/1984 | Barry et al. | 340/450.3 |
| 4,506,258 | 3/1986 | Charboneau et al. | 340/450.3 |
| 4,596,141 | 6/1986 | Kondo | 340/622 |
| 4,638,288 | 1/1987 | Remec | 340/622 |
| 4,654,646 | 3/1987 | Charboneau | 340/450.3 |
| 4,679,432 | 7/1987 | Draeger | 73/295 |
| 4,720,997 | 1/1988 | Doak et al. | 73/295 |
| 4,771,271 | 9/1988 | Zanini-Fisher | 340/622 |
| 4,988,975 | 1/1991 | Nap | 340/622 |

FOREIGN PATENT DOCUMENTS

| | | | |
|---|---|---|---|
| 1-199124 | 8/1989 | Japan | 73/295 |
| 1-209322 | 8/1989 | Japan | 73/295 |

Primary Examiner—Thomas B. Will
Attorney, Agent, or Firm—Michael P. Breston

[57] ABSTRACT

The interface gauge includes at least one transducer for sensing the interface between two media within a reservoir. An elongated flat member has at least one transverse bore. A transducer is loosely contained within the bore. Conductors connect the transducer to a signal comparator and logic network for monitoring an impedance change in the transducer in response to a change in the interface within the reservoir. The gauge can replace conventional mechanical dipsticks in factory made dipstick tubes for crankcases and automatic transmissions in order to monitor oil and transmission fluid levels.

19 Claims, 2 Drawing Sheets

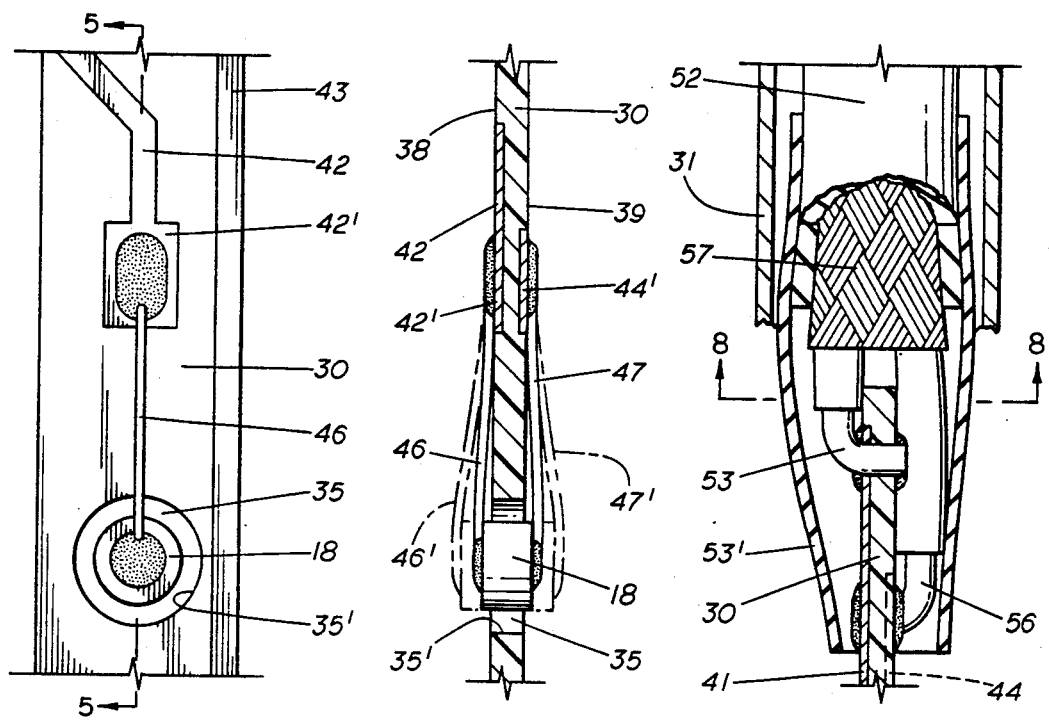
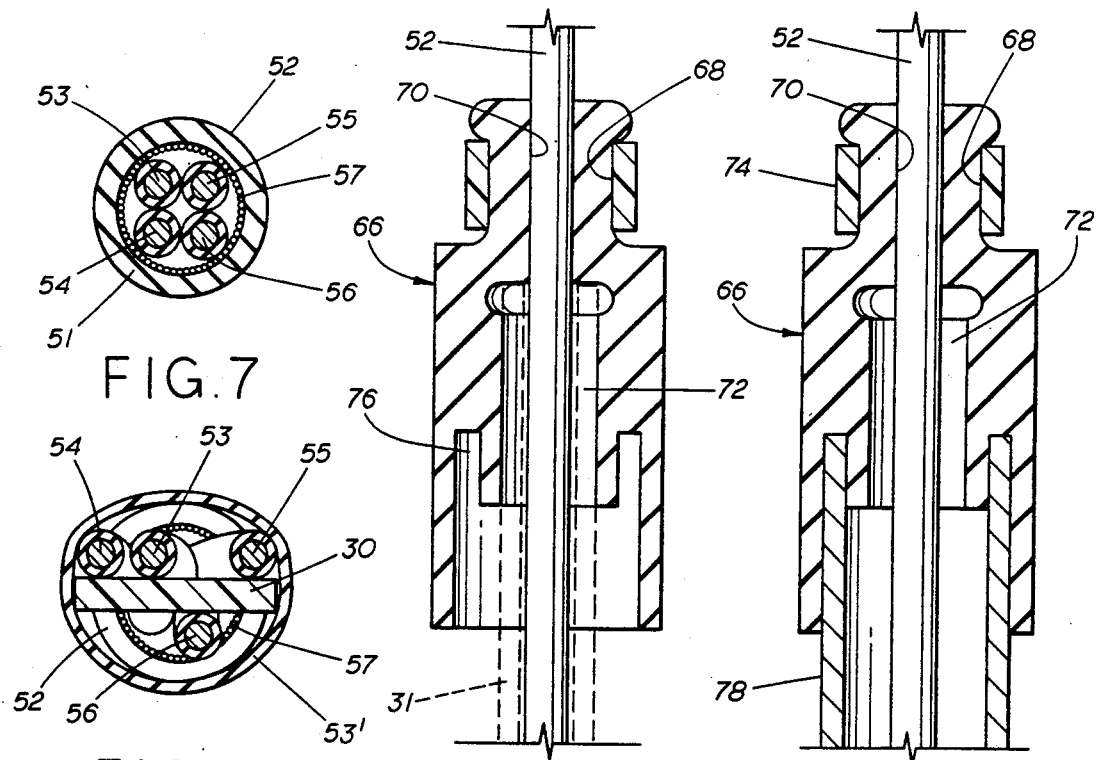

ELECTRONIC GAUGE FOR INTERFACE MEASUREMENTS

FIELD OF THE INVENTION

This invention relates generally to electrically operated gauges for detecting a change in the location of an interface between two fluids or solids or combinations thereof, and for producing, for example, a warning that the interface is dangerously low, or that it is at one or more prescribed levels, or is within a predetermined range.

DESCRIPTION OF THE PRIOR ART

In my U.S. Pat. No. 4,720,997 is described a level monitor 9 for crankcase oil which includes an electron signal comparator and logic network 10 for activating one of three level-indicating devices, such as a green LED 71, a red LED 82 and a yellow LED 83.

Monitor 9 utilizes level-detecting sensors such as negative-coefficient thermistors 40-42 that are fixedly mounted on top of a flexible dipstick 89 adapted to be removably received within a dipstick tube leading to a crankcase 88 for monitoring the level of its oil.

In the process of insertion and removal, dipstick 89 sometimes encountered several Problems due primarily to the unusual and diverse shapes of factory made dipstick tubes, their location within the crankcase, the limited access thereto, especially in vans and trucks, and further due to internal walls within the crankcase which tended to scrape against dipstick 89.

One or more of such problems caused some of the thermistors to become detached and break away from dipstick 89, or caused physical damage to the thermistors themselves together with their lead wires.

Also, because thermistors 40-42 were fixedly mounted on top of flexible dipstick 89, crankcase dirt tended to accumulate under and around the thermistors. Such dirt prevented ambient oil to properly cool the thermistors as required, thereby slowing down and distorting their responses to changing oil levels resulting in erratic oil level monitoring. In addition, the mass of the dipstick itself tended to act as a heat sink for the thermistors, which further reduced the ability of the ambient oil to properly cool the thermistors.

The above and other apparent problems have been overcome by the present invention.

SUMMARY OF THE INVENTION

The interface gauge includes at least one transducer for sensing the interface between two media within a reservoir. An elongated flat member has at least one transverse bore. A transducer is contained within the bore. Cable means including conductor means connect the transducer to a signal comparator and logic network for monitoring an impedance change in the transducer in response to a change in the interface within the reservoir.

The bore is preferably dimensioned for loosely containing its transducer. The conductor means include printed conductors on the flat member, and a pair of lead wires connect the transducer to the printed conductors on the opposite faces of the flat member which is made of a dielectric, flexible material. The lead wires resiliently suspend and retain their transducer in operative position within its bore for limited movement therewithin. The lead wires are preferably resilient, parallel to each other, and extend in the same longitudinal direction on the opposite faces of the board.

BRIEF DESCRIPTION OF THE DRAWINGS

FIG. 4 is an enlarged partial front view of a single thermistor suspended by its lead wires as shown in FIG. 2;

FIGS. 5-9 are sectional views taken on lines 5—5, 6—6, 7—7 8—8 and 9—9 on FIG. 2; FIG. 5 illustrates the resilient suspension of a single thermistor and its limited motion within its bore; FIG. 6 shows the connection between a wire in the cable and a printed conductor on the board; FIGS. 7-8 are sectional views of the cable at different locations; FIG. 9 is a sectional view of the seal member for a crankcase dipstick tube; and FIG. 10 is a sectional view of the same seal member but for an automatic transmission dipstick tube.

DETAILED DESCRIPTION OF A PREFERRED EMBODIMENT

Figure 1:
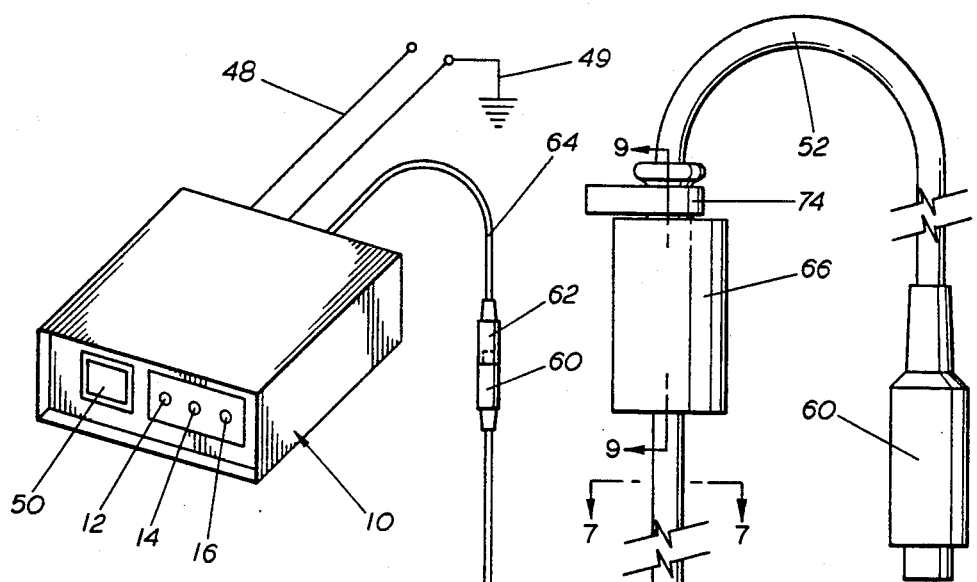
FIG. 1 is a schematic sectional representation of a crank case for an internal combustion engine within which the preferred embodiment of the level gauge of the invention is installed.
Figures 2, 3:
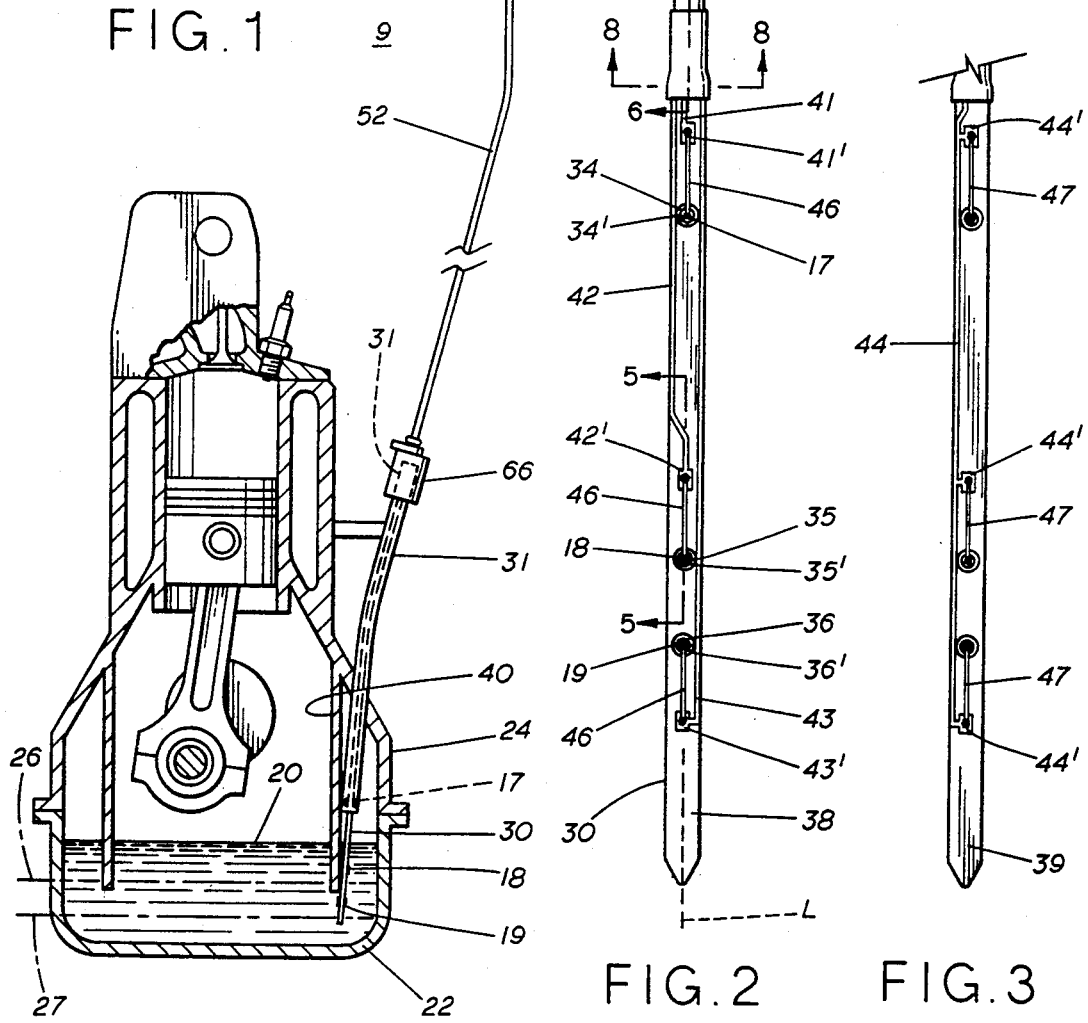
FIG. 2 is a front elevation perspective view of the transducer-carrying board and its cable assembly.
FIG. 3 is a partial rear elevation view of the transducer carrying board shown in FIG. 2.

Throughout the drawings, the same reference characters designate the same or similar parts.

The change in the location of an interface between two or more media having distinct physical and/or electrical characteristics can be measured electrically because such an interface change is characterized by an abrupt change in the densities or dielectric constants of the ambient media.

While the utility of the present invention will be specifically illustrated for monitoring the levels of engine oil and automatic transmission fluid, it is not limited thereto and has a wide range of applications.

Gauge 9 (FIG. 1) includes an electronic signal comparator and logic network 10 having at least one but preferably three level-indicating devices such a green LED 12, a red LED 14 and a yellow LED 16. The detailed description of network 10 can be found in my said U.S. Pat. No. 4,720,997, which is incorporated herein by reference.

Network 10 can be dashboard mounted for gauging, in a scorcher summer day or in an ice-cold winter day, from the driver's seat the engine oil or transmission fluid in an internal combustion engine, thereby eliminating the potential for costly engine damage.

Gauge 9 utilizes at least one but preferably three transducers which preferably are negative-coefficient thermistors 17-19 (FIG. 1). Reference thermistor 17 is positioned in close proximity to thermistors 18-19, but it should always remain in the air above "normal level" 20, which represents the recommended level within oil pan 22 of crankcase 24.

Thermistors 18 and 19 are vertically spaced-apart so that both will be immersed in the oil below level 20: thermistor 18 is positioned below thermistor 17 and adjacent to and above "add-oil" level 26, and thermistor 19 is positioned below thermistor 18 and adjacent to and above the "danger level" 27.

Thermistors 17-19 are carried on a thin, elongated, generally flat and straight board 30 (FIGS. 1-5) made from a liquid impervious, flexible dielectric plastic material. Board 30 has a longitudinal center axis L, a rectangular cross-section and is substantially longer than it is wide. Its width is less than the internal diameter of the curved dipstick tube 31 leading to crankcase 24.

Board 30 has at least one but preferably three longitudinally-spaced, transverse bores 34-36 (FIG. 2) within cylindrical walls 34'-36', respectively. Each bore extends through the thickness of the board's material between its lateral front face 38 and rear face 39 and in a direction perpendicular to its longitudinal axis L.

While bores 34-36 reduce the rigidity of board 30, it nevertheless remains strong enough to resist any tendency to twist relative to its longitudinal axis L as it flexes inside curved dipstick tube 31 or attempts to deflect from the cylindrical wall 40 (FIG. 1) within crankcase 24.

Three longitudinal conductors 41-43 (FIG. 2) are printed on front face 38 and a common conductor 44 is printed on rear face 39 (FIG. 3) of board 30. Printed conductors 41-44 firmly adhere to and are insulated from each other by the board's dielectric material.

The parallel longitudinal layout of printed conductors 41-44 is merely illustrative of how board 30 can be put to use.

At desired points, printed conductors 41-44 have printed extensions 41'-44', respectively, which serve as connection areas. Printed conductors 41-44 have sufficient flexibility to conform to the shape of board 30 as it flexes. The printed conductors are covered with an insulating thin protective conformal coating (not shown) to serve as a fluid barrier.

Bores 34-36 (FIGS. 4-5) are dimensioned for loosely containing thermistors 17-19, respectively, thereby (1) to allow ambient air or oil to contact substantially the entire external surface of the thermistors, (2) to protect them against physical and/or electrical damage from ambient objects, and (3) to thermally isolate them from board 30.

The bores' cylindrical walls 34'-36' shelter and protect their respective delicate thermistor devices 17-19 and prevent them from snapping off and separating from board 30 as well as from engaging the inner wall of dipstick tube 31 (FIG. 1) during insertion into and removal therefrom of board 30.

Since each thermistor is loosely received within its bore, (1) oil, transmission fluid or dirt are prevented from sticking to the thermistor's walls, (2) oil or transmission fluid drains away from the thermistor, and (3) complete oil or transmission fluid circulation can take place around its walls for maximum cooling effect.

For the above reasons the diameter of each one of bores 34-36 bore should be as large as possible consistent with the physical constraints imposed on board 30 by its printed conductors 41-44 and by the internal diameter of dipstick tube 31.

Each one of thermistors 17-19 preferably has a cylindrical shape and a pair of axially-opposed, flexible lead wires 46-47 which are parallel to each other and extend on the opposite faces 38-39, respectively, of board 30 and in the same longitudinal direction L.

Lead wire 47 of each thermistor is soldered to an extension 44' (FIG. 5) of common conductor 44, and lead wires 46 of thermistors 17,18,19 are soldered to extensions 41'-43' of conductors 41-43, respectively.

Conductors 41-44 can connect thermistors 17-19 in various networks consisting of series and/or parallel combinations. In the preferred embodiment, thermistors 17-19 are connected in parallel circuit relationship.

Lead wires 46-47 resiliently suspend and retain each thermistor in operative position within its bore and allow it limited motion transversely in either direction substantially perpendicular to longitudinal axis L, as shown by the dotted lead lines 46',47' (FIG. 5). Such resilient suspension minimizes any tendency which each thermistor and its lead wires might have from breaking away from board 30 and/or from its printed conductors, especially when board 30 is inserted into and is removed from a curved dipstick tube 31 and/or is forced to deflect from an internal crankcase wall 40 (FIG. 1).

DC power for operating signal processing network 10 (FIG. 1) can be derived from the engine battery to supply a voltage regulator which continuously provides a regulated DC voltage between line 48 and ground 49.

Printed conductors 41-44 are connected to comparator network 10 through a flexible cable 52 (FIGS. 1, 6-8) whose jacket 51 encloses four insulated wires 53-56 and a metal shield 57. Wires 53-56 are soldered to the ends of corresponding printed conductors 41-44. These soldered connections are covered by an insulating sleeve 53'. The other ends of wires 53-56 are also connected to a female connector 60 for mating with a multi-pin male connector 62 of a second such cable 64 leading to dashboard mounted network 10.

A tubular seal member 66 (FIG. 9), having a reduced upper neck portion 68, defines a longitudinal center bore 70 which snugly receives a precisely predetermined portion of first cable 52. Seal member 66 also defines an interior chamber 72 dimensioned to snugly receive therein the tip end of dipstick tube 31. A suitable detachable and adjustable locking means 74 on neck portion 68 detachably and sealingly secures seal member 66 to cable 52, thereby customizing the length of cable 52 for a particular dipstick tube 31.

The position of seal member 66 on cable 52 is measured so that middle thermistor 18 is located at a predetermined position inside oil pan 22 above add-oil level 26, while the upper end of board 30 together with its reference thermistor 17 remain inside dipstick tube 31 (FIG. 1).

Preferably, seal member 66 also defines an annular interior cavity 76 (FIGS. 9-10) concentric with cylindrical chamber 72. Annular cavity 76 has a larger diameter than that of cylindrical chamber 72. Cavity 76 snugly receives therein the tip of a transmission dipstick tube 78. In this manner the same seal member 66 can be used to seal off two types of factory dipstick tubes.

It is the function of gauge 9 to detect whether thermistor 19 or both thermistors 18 and 19 are immersed in oil. To this end, comparator network 10 compares the voltages at thermistors 18 and 19 against the reference voltage at thermistor 17. Dependent upon the relative amplitudes of these respective voltages, one of LEDS 12, 14 or 16 will turn on.

When an oil level reading is desired, a timer circuit in network 10 is activated by momentarily depressing push-button switch 50 (FIG. 1) which starts an energizing cycle whose duration is predetermined, say about 2 minutes and 5 seconds. After a single cycle, the timer circuit automatically stops.

Currents flow will heat un thermistors 17, 18 and 19. Because the resistance of each thermistor varies exponentially with its temperature, a small increase in temperature lowers the resistance of the negative-coefficient thermistor by a large amount. A thermistor stays cooler when immersed in oil than in air, and the resistance of a heated negative coefficient thermistor in oil will be higher than when the thermistor is in air.

When thermistors 18 and 19 are both immersed in oil, only green LED 12 is illuminated which indicates that oil in pan 22 is at about normal-level 20. Whichever LED becomes lit will remain illuminated until the timer circuit stops.

When the oil level in pan 22 drops slightly below level 26, thermistor 19 remains immersed in oil while thermistor 18 is surrounded only by a thin film of oil and acts as if surrounded by air which causes yellow LED 16 to turn on. When yellow LED 16 is lit, it means that oil is at or below add-oil level 26 and that there is a need to add 1 quart of oil.

When the oil level drops below danger level 27, all three thermistors 17-19 are surrounded by air. Each thermistor reaches approximately the same temperature of approximately 200° F. and red LED 14 turns on. When red LED 14 is lit, it means that oil is at or below level 27 and that there is a need to add 2 quarts of oil to oil pan 22.

It will be appreciated that in the process of insertion into and removal from tube 31, board 30 can easily flex and pass through unusual and diverse shapes of factory made dipstick tubes 31, especially in vans and trucks. Board 30 can deflect without damage from internal walls 40 within crankcase 24 and without scraping off one or more of thermistors 17-19 and/or their lead wires 46-47.

Also, because thermistors 17-19 are loosely received within bores 34-36, crankcase dirt no longer tends to accumulate under and around thermistors 18-19 and ambient oil is allowed to properly cool the thermistors as required. In addition, the mass of board 30 is isolated from thermistors 17-19 and does not tend to act as a heat sink for the thermistors, which further enhances the ability of the ambient oil to properly cool the thermistors.

It will be further appreciated that the improved gauge board 30 is safe, trouble-free, and accomplishes its objectives by virtue of its simplicity, flexibility, versatility and low cost of manufacture.

What I claim is:

1. An interface gauge, comprising:
    at least one transducer for sensing the level of an interface between two media within a reservoir;
    an elongated flat member having opposite faces and begin made of a dielectric flexible material which is easily deformable in a direction perpendicular to its longitudinal axis;
    said member defining between said opposite faces at least one transverse bore dimensioned for loosely containing said transducer therewithin;
    a logic network;
    a cable including conductor means for connecting said transducer to said logic network;
    said conductor means including printed conductors on said dielectric material;
    a pair of wires for connecting said transducer to said printed conductors; and
    a signal comparator coupled to said network, and said comparator having means for signaling a change in said interface level.

2. A gauge according to claim 1, wherein
    said wires are resilient, substantially parallel to each other, and extend int he same longitudinal direction on said opposite faces of said member, and
    said wires resiliently suspend and retain said transducer in operative position within said bore for limited movement therewithin.

3. A gauge according to claim 1, wherein
    said wires are substantially parallel to each other and extend in the same longitudinal direction on said opposite faces of said flat member; and
    said printed conductors, said wires, and said transducer form an electric circuit having animpedance which is indicative of said change in said interface level.

4. A gauge according to claim 3, wherein
    said reservoir contains oil, and
    said interface is between said oil and air.

5. A gauge according to claim 3, wherein
    said reservoir contains hydraulic fluid, and
    said interface is between said hydraulic fluid and air.

6. A gauge according to claim 3, and including another transducer of providing a reference signal to said network.

7. A gauge according to claim 6, wherein
    said member has another transverse bore for loosely containing said other transducer therewithin, and
    resilient wires for connecting said other transducer to said printed conductors.

8. A gauge according to claim 7, and further including
    a seal member having a longitudinal center bore for receiving a predetermined portion of said cable therein, and
    detachable locking means for detachably securing said seal member to said cable.

9. A gauge according to claim 8, wherein
    said reservoir has a tube extending externally from and is in fluid communication with said reservoir; and
    said seal member defines a first chamber concentric with said center bore, and said first chamber receives therein the tip end of said tube.

10. A gauge according to claim 9, wherein
    said seal member defines a second chamber concentric with said first chamber, and said second chamber is adapted to receive therein the tip end of a second tube from a second reservoir.

11. An interface gauge, comprising:
    at least one transducer for sensing the level of an interface between two fluid media within a reservoir;
    an elongated flat member having opposite faces and being made of a flexible material which is easily deformable in a direction perpendicular to its longitudinal axis;
    said member defining between said opposite faces at lest one transverse bore dimensioned for containing said transducer therewithin so as to permit fluid circulation all around its exterior walls;
    conductor means on said flat member and galvanic means for connecting said transducer in said bore to said conductor means; and
    said transverse bore being dimensioned to allow relative motion between said transducer and said flat member.

12. A gauge according to claim 11, wherein said galvanic mean resiliently suspend and retain said thermistor in operative position within said bore for limited movement therewithin.

13. A gauge according to claim 11, wherein
said member is made of a dielectric flexible material;
said conductor means include printed conductors on said dielectric material; and
said galvanic means include a pair of flexible wires for connecting said transducer to said printed conductors.

14. A gauge according to claim 13, and
another transducer;
said member has another longitudinally-spaced transverse bore for loosely containing said other transducer therewithin; and
galvanic means for connecting said other transducer to said printed conductors.

15. A gauge according to claim 14, and
a cable including said conductor means;
a seal member having a longitudinal center bore for receiving a predetermined portion of said cable therein, and
detachable locking means for detachably securing said seal member to said cable.

16. A gauge according to claim 15, and
a first hollow tube having a lower end coupled to said reservoir and an upper end;
said flat member is removably received within said tube through said upper end; and
said seal member defines a first chamber concentric with said center bore, and said first chamber receives said upper end of said first tube.

17. A gauge according to claim 16, and
a second fluid reservoir;
a second hollow tube having a lower end coupled to said second reservoir and an upper end;
said seal member defines a second chamber concentric with said first chamber; and
said second chamber is adapted to receive therein said upper end of said second tube.

18. An interface gauge, comprising:
at least two transducers for sensing the level of an interface between two media within a reservoir;
an elongated flat member having opposite faces and being made of a dielectric flexible material which is easily deformable in a direction perpendicular to its longitudinal axis;
said member defining between said opposite faces at lest tow longitudinally-sapced, transverse bores, each bore being dimensioned for loosely containing one of is a transducers therewithin so as to permit fluid circulation all around its exterior walls;
cable means including printed conductors on said dielectric material; and
a pair of wires for connecting each transducer to said printed conductors.

19. An interface gauge according to claim 18, and
a logic network;
said cable means connecting said transducer to said network; and
a signal comparator coupled to said network and having means for signaling a change in the level of said interface within said reservoir.

* * * * *